US012142897B2

(12) United States Patent
Meyer et al.

(10) Patent No.: US 12,142,897 B2
(45) Date of Patent: Nov. 12, 2024

(54) MULTI-SPARK GAP

(71) Applicant: Phoenix Contact GmbH & Co. KG, Blomberg (DE)

(72) Inventors: Thomas Meyer, Ottenstein (DE); Rainer Durth, Horn-Bad Meinberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 18/307,102

(22) Filed: Apr. 26, 2023

(65) Prior Publication Data

US 2023/0352916 A1 Nov. 2, 2023

(30) Foreign Application Priority Data

Apr. 28, 2022 (DE) ..................... 10 2022 110 330.7

(51) Int. Cl.

*H01T 1/14* (2006.01)
*H01T 1/20* (2006.01)
*H01T 4/04* (2006.01)
*H01T 4/16* (2006.01)

(52) U.S. Cl.

CPC ................ *H01T 4/16* (2013.01); *H01T 1/14* (2013.01); *H01T 1/20* (2013.01); *H01T 4/04* (2013.01)

(58) Field of Classification Search

CPC .... H01T 1/20; H01T 1/04; H01T 1/14; H01T 1/02; H01T 1/22; H01T 2/02; H01T 4/16; H01T 4/12; H01T 4/10; H01T 4/20; H01T 4/14; H01T 4/06

See application file for complete search history.

(56) References Cited

U.S. PATENT DOCUMENTS 8,890,393 B2 11/2014 Krauss et al.
2014/0132157 A1* 5/2014 Ehrhardt .................. H01T 4/16 315/127
2020/0161073 A1* 5/2020 Rozman .................. H01J 11/22

FOREIGN PATENT DOCUMENTS

DE 19742302 A1 4/1999
WO WO-2017080825 A1 * 5/2017 ............... H01T 4/04

OTHER PUBLICATIONS

English Translation of WO 2017080825 A1 (Year: 2017).*

* cited by examiner

*Primary Examiner* — Bryan R Perez
(74) *Attorney, Agent, or Firm* — Calderon Safran & Wright P.C.; David S. Safran

(57) ABSTRACT

A multi-spark gap having both a high power-follow current extinguishing capacity as well as a relatively low protective level in which a distance $x_1$ between a first electrode and an adjacent second electrode, which together form a first individual spark gap, is larger than respective distances $x_2$ between other adjacent electrode pairs of additional individual spark gaps. The distance x1 is at least 0.5 mm and the distances x2 of the additional individual spark gaps are at most 0.2 mm. Additionally, an ignition aid for igniting the first individual spark gap is provided, which aid has at least a resistive ignition element and a voltage-limiting element, wherein the ignition element is connected to an electric-arc combustion chamber of the first individual spark gap and is electrically connected on the one side to the first electrode and on the other side via the voltage-limiting element to the second contact element.

13 Claims, 2 Drawing Sheets

MULTI-SPARK GAP

BACKGROUND OF THE INVENTION

Field of the Invention

The invention relates to a multi-spark gap for an overvoltage protector, with multiple electrodes, and insulation elements arranged between the electrodes, wherein in each case, two electrodes facing one another form an individual spark gap, and the individual spark gaps are connected in series. To make electrical connection, the multi-spark gap has two electrically conductive contact elements, between which the electrodes are arranged, so that the first contact element makes electrical contact with the first electrode, and the second contact element makes electrical contact with the last electrode of the multi-spark gap.

Description of the Related Art

Overvoltage protectors have been known in a wide variety of designs from the state of the art and are used for protecting electrical devices or lines from overvoltages, which can be caused by, for example, lightning strikes or defects in technical systems. In this case, spark gap arrangements with multiple electrodes have been used for decades in the field of overvoltage protection of electrical devices and systems.

For discharging high overvoltages while simultaneously ensuring a high power-follow current extinguishing capacity, multi-spark gaps are frequently used, which because of their design are frequently also referred to as stack spark gaps. Such stack spark gaps consist of multiple electrodes and multiple insulation units, which are arranged between the individual electrodes, so that in each case, one insulation unit is found between two electrodes, which has an opening in the center so that two electrodes form one individual spark gap. The electrodes are frequently designed as circular or rectangular graphite disks, between which corresponding circular or frame-like insulation units are then arranged. The insulation units are in this case frequently designed as thin insulation disks or insulation foils made of plastic, for example PTFE.

To influence the ignition behavior of a multi-spark gap, it is known from the state of the art to provide control circuits, which have multiple passive control elements. German Patent Application Publication DE 19742302 A1 thus discloses a multi-spark gap that consists of multiple individual spark gaps that are connected in series, wherein the individual spark gaps, with the exception of the individual spark gaps that respond only in the case of discharge, are protected against high voltage by a graduated network of resistors, so that the individual spark gaps successively interconnect. In this case, a resistor is connected in parallel to each individual spark gap, and the resistors of all individual spark gaps are connected in series to one another and grounded. So that the response voltage of the multi-spark gap does not exceed a maximum value of, for example, 4 kV, in this case the distance between the two electrodes of the first individual spark gap is to be set correspondingly small.

Frequently, capacitances, in particular capacitors, are also used as control elements in the case of multi-spark gaps, wherein one capacitor each with a connector makes contact with an electrode, and all capacitors are connected in an electrically conductive manner to one another with their second connector and with the second connector or the second contact element of the multi-spark gap. As a result, in each case there is a capacitive voltage divider that concentrates the given voltage on an individual spark gap. If this individual spark gap has ignited, the entire voltage rests on the next individual spark gap, reduced only by the arc voltage of the first individual spark gap, so that the individual spark gaps successively interconnect.

Different variants are known from experience, such as the individual electrodes and the individual insulation units that can be connected to form a multi-spark gap. Frequently, for this purpose, large-area contact plates are used as contact elements, which form the front sides of the multi-spark gap and are braced with one another via multiple guide rods in the axial direction by being screwed together, so that the individual electrodes and the individual insulation units are clamped between the contact plates in their stack-like arrangement. When the guide rods that are arranged on the outside between the contact plates are directed past the individual electrodes, this ensures that the required installation space is relatively large.

German Patent Application Publication DE 10 2011 102 864 A1 and corresponding U.S. Pat. No. 8,890,393 B2 disclose a stack spark gap with multiple individual spark gaps connected in series, wherein the individual electrodes are arranged in each case in an insulation element. The insulation elements have in each case a recess for accommodating a disk-like electrode and a receptacle for a control element, wherein the receptacle for the control element is connected to the recess for the electrode. In this case, a control element is connected via a contact spring to the edge of the electrode, so that a triggering of the individual electrodes of the stack spark gap can be achieved via the control elements.

Compared to individual spark gaps, multi-spark gaps have the advantage of an improved power-follow current extinguishing capacity. The ability to extinguish the power-follow current in this case increases with an increasing number of individual spark gaps. At the same time, however, the response voltage of the multi-spark gap also increases with an increasing number of individual spark gaps. Multi-spark gaps that consist of many individual spark gaps therefore have a high power-follow current extinguishing capacity, but at the same time also have a protective level that is generally too high for low-voltage applications.

SUMMARY OF THE INVENTION

The object of this invention is therefore to provide a multi-spark gap that has both a high power-follow current extinguishing capacity and as low a protective level as possible.

This object is achieved in the case of the above-described multi-spark gap a providing a distance $x_1$ between the first electrode and the adjacent second electrode, which together form the first individual spark gap, and is larger than the respective distances $x_2$ between the other adjacent electrodes, which form the additional individual spark gaps. In addition, an ignition aid for igniting the first individual spark gap is provided, which aid has at least a resistive ignition element and a voltage-limiting element, wherein the ignition element is connected to the electric-arc combustion chamber of the first individual spark gap and is electrically connected on the one side to the first electrode and on the other side via the voltage-limiting element to the second contact element.

The multi-spark gap according to the invention is divided at least functionally into two areas. The first area comprises the first individual spark gap, and the second area the other individual spark gaps. The second area thus comprises all electrodes except for the first electrode, which is connected in an electrically conductive manner to the first contact element, while the first area comprises only the first two electrodes. The second electrode that is adjacent to the first electrode and that forms the first individual spark gap with the first electrode is in this case assigned to both the first area and the second area, since the second electrode also forms with the next electrode an additional individual spark gap, the second individual spark gap.

The reduction of the respective distances $x_2$ between the adjacent electrodes, which form the additional individual spark gaps, in comparison to the distances of the usual individual spark gaps, results in a reduction of the response voltage in this area. This is advantageous with respect to the protective level of the multi-spark gap that is desired to be as low as possible, but at the same time it results in an undesirable reduction of the insulation strength in this area, in particular during operation, when fouling at the respective insulated sections occurs after the multi-spark gap ignites.

In order to ensure that the multi-spark gap according to the invention still has sufficiently high insulation strength, the distance $x_1$ between the first electrode and the adjacent second electrode is set to be large, so that the first individual spark gap has an insulation strength that is sufficient for the respective system voltage. Since a correspondingly larger distance $x_1$ between the first electrode and the adjacent second electrode, which together form the first individual spark gap, results in a response voltage that is considerably above the market standard requirements, the multi-spark gap according to the invention in addition still has an ignition aid for igniting the first individual spark gap.

In this case, the ignition aid consists of at least a resistive ignition element and a voltage-limiting element, for example a varistor. The ignition element is electrically connected on the one side to the first electrode and on the other side via the voltage-limiting element—directly or indirectly—to the second contact element. In addition, the ignition element is spatially connected to the electric-arc combustion chamber of the first individual spark gap, i.e., the ignition element extends with its front side into the electric-arc combustion chamber or is arranged on the edge of the electric-arc combustion chamber. When an overvoltage that is greater than the response voltage occurs, initially current flows from the second contact element via the voltage-limiting element and the resistive ignition element to the adjacent first electrode and to the first contact element. The current flow via the ignition element in this case results in a discharge on the surface of the ignition element, so that gas that is ionized inside the electric-arc combustion chamber is generated in the ignition area adjoining the ignition element, which gas spreads into the electric-arc combustion chamber. This results in a reduction of the breakdown voltage of the first individual spark gap, so that it results in an ignition of the first individual spark gap between the first electrode and the adjacent second electrode.

The response voltage of the multi-spark gap according to the invention is thus determined by the response voltage of the ignition aid and not by the response voltage of the first individual spark gap, so that despite the increased distance $x_1$ of the first individual spark gap, a sufficiently low response voltage of the multi-spark gap can be achieved. In particular, because of the design of multiple individual spark gaps with the multi-spark gap according to the invention, it is possible to achieve a high power-follow current extinguishing capacity and at the same time a relatively low protective level. When designing the multi-spark gap for a 230/400 V system, a protective level of, for example, 1.5 kV can thus be achieved.

It was previously stated that the resistive ignition element is electrically connected on the one side to the first electrode and on the other side via the voltage-limiting element, directly or indirectly, to the second contact element. This means that the resistive ignition element must not be connected directly and permanently via the voltage-limiting element in an electrically conductive manner to the second contact element. Rather, it is also possible that other electrical components, which include ignition aids, are arranged in the series circuit that consists of an ignition element and a voltage-limiting element.

Thus, according to an advantageous configuration of the invention, the ignition aid also has a voltage switch element, which is arranged with the resistive ignition element and the voltage-limiting element in a series circuit. The voltage switch element can in this case be arranged both between the resistive ignition element and the voltage-limiting component and between the voltage-limiting element and the second contact element. The response voltage of the ignition aid is then determined by the response voltage of the voltage switch element, since the ignition circuit is conductive only in the case of an overvoltage that is greater than the response voltage of the voltage switch element. Another advantage of this ignition aid is that the outer voltage queued up on the multi-spark gap is already limited during the ignition process by the ignition circuit, i.e., the series circuit that consists of the voltage switch element, voltage-limiting element, and resistive ignition element, until the multi-spark gap has completely ignited. In this case, voltage spikes during ignition are limited by the ignition circuit.

In addition, it is especially preferred when the voltage switch element, in which there can be, for example, a gas discharge valve (GDV), is arranged in such a way between the second contact connector and the voltage-limiting element that it is also simultaneously arranged electrically between the second contact element and the control circuit for controlling the ignition behavior of the additional individual spark gaps, so that the control circuit is connected to the second contact element in an electrically conductive manner only in the case of discharge, when the voltage switch element has responded.

According to a configuration of the multi-spark gap according to the invention, the control circuit has capacitors as control elements, wherein in each case, a capacitor makes electrical contact with an electrode of the additional individual spark gaps with its first connector, and the individual capacitors are electrically connected to one another with their second connectors and to the second contact element. Also, in this case, relative to the connection of the second connectors of the control elements or the capacitors, it holds true that the latter can be connected both directly and indirectly to the second contact element. An indirect connection can be achieved according to the above-mentioned advantageous configurations, in that a voltage switch element is arranged between the common reference point of the second connectors of the control elements or the capacitors and the second contact element. This has the advantage that the control circuit is connected in an electrically conductive manner to the second contact element only in the case of discharge, i.e., only when an overvoltage that is greater than the response voltage of the voltage switch element is present in the multi-spark gap. This ensures an improvement in the insulation property of the multi-spark gap.

It was previously stated that to ensure a sufficiently high insulation strength, the distance $x_1$ between the first electrode and the adjacent second electrode is set to be large, so that the first individual spark gap has an insulation strength that is sufficient for the respective system voltage. With proper use of the multi-spark gap in the power supply of low-voltage networks, the distance $x_1$ is preferably at least 0.5 mm, in particular between 1 mm and 2 mm. Such a relatively large distance between the two electrodes of the first individual spark gap would normally ensure such a high protective level that the multi-spark gap would not meet the now common requirements for overvoltage arresters. Because of the ignition aids used according to the invention in the case of multi-spark gaps with at least a resistive ignition element and a voltage-limiting element, however, the response voltage of the multi-spark gap and thus its protective level can be reduced decisively.

The distances $x_2$ between the adjacent electrodes of the additional individual spark gaps are, however, considerably smaller than the distance $x_1$. According to a preferred configuration, the distances $x_2$ are at most at 0.2 mm, in particular between 0.05 mm and 0.15 mm. In the case of the preferred sizing of the multi-spark gap according to the invention, the distance $x_1$ is thus at least five times the distance $x_2$. Even when in principle the distances $x_2$ between the adjacent electrodes of the additional individual spark gaps can deviate from one another, it is thus also advantageous from the manufacturing viewpoint when the distances $x_2$ between the adjacent electrodes of the additional individual spark gaps are the same or essentially the same within the framework of customary manufacturing tolerances.

The multi-spark gap according to the invention thus uses the advantage of multi-spark gaps with multiple individual spark gaps, namely their high power-follow current extinguishing capacity, wherein at the same time, the drawback of a relatively high protective level that is otherwise present in such multi-spark gaps is eliminated. The individual electrodes of the multi-spark gap are preferably designed as rectangular or round thin carbon disks. The thickness of the electrode disks is in this case preferably less than 1 mm, in particular less than 0.75 mm, for example only approximately 0.5 mm to 0.6 mm.

The insulation elements between the individual electrodes of the multi-spark gap can consist in principle of individual insulation disks or insulation foils, which in each case are made circular or frame-like. Advantageously, the individual insulation elements, however, are part of a common insulation and holding arrangement, in which both the individual electrodes and the two contact elements are arranged. The insulation and holding arrangement then simultaneously also provides for the secure mechanical attaching of the individual electrodes of the multi-spark gap.

As an alternative to this, the individual insulation elements can also in each case be part of an insulation and holding frame, wherein then the individual insulation and holding frames are connected to one another, in particular screwed together or latched with one another. The individual insulation and holding frames can then in each case have a receptacle opening for accommodating a control element.

In particular, there are a number of options for further developing and configuring the multi-spark gap according to the invention. To this end, reference is made to the following description of preferred embodiments with reference to the accompanying drawings.

DETAILED DESCRIPTION OF THE DRAWINGS

Figure 1:
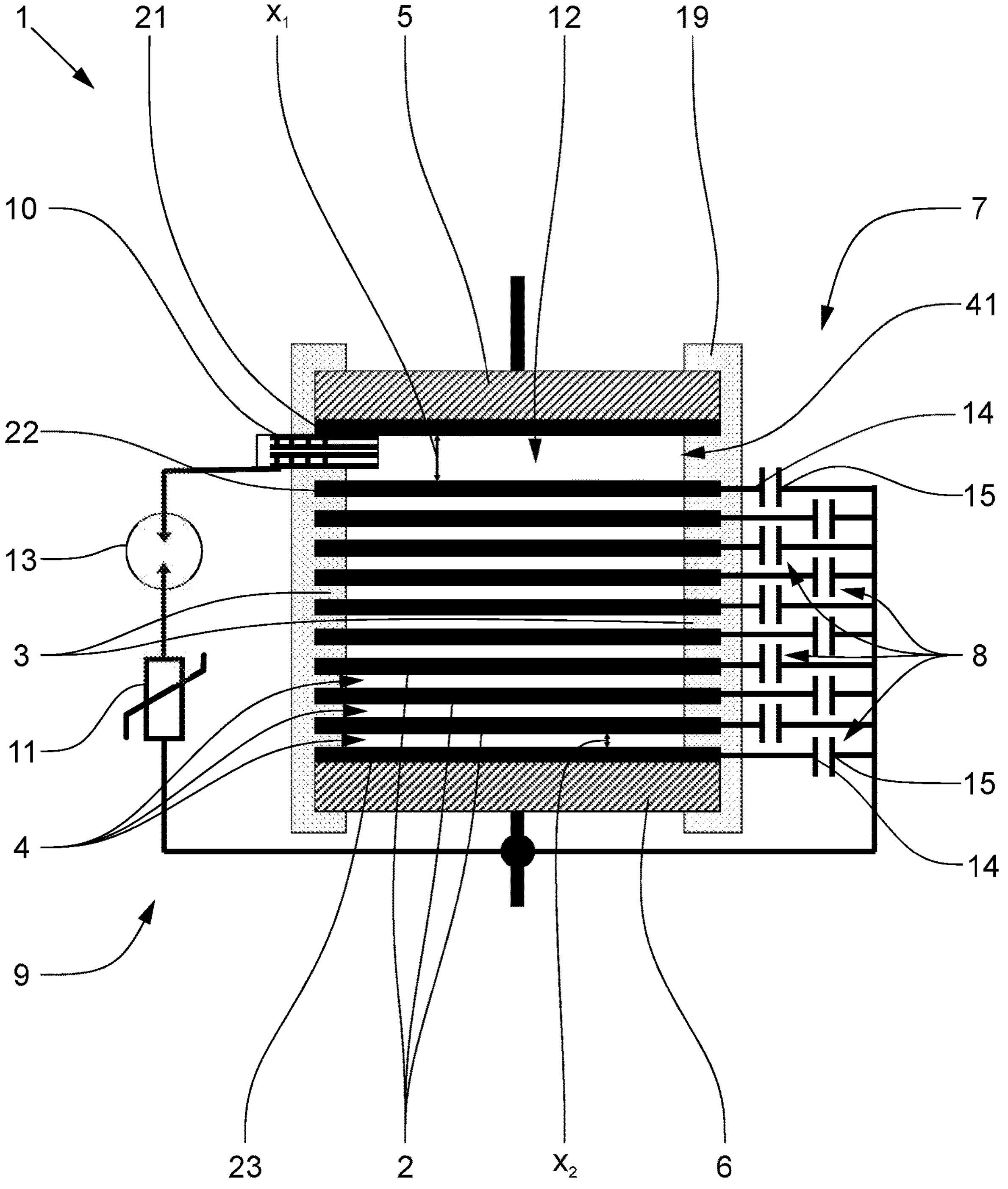
FIG. 1 shows a schematic diagram of a first embodiment of a multi-spark gap, in sectional view.

The two figures in each case show a schematic diagram of a multi-spark gap 1 according to the invention, which has multiple electrodes 2 and insulation elements 3 arranged between the electrodes 2. In each case, two electrodes 2 facing one another in this case form an individual spark gap 4, wherein the individual spark gaps 4 in turn are connected in series. The first electrode 21 that is depicted above in the figures' forms with the adjacent second electrode 22 a first individual spark gap 41, which differs from the other individual spark gaps 4 in its design. In addition, the first electrode 21 is electrically connected to the first contact element 5, while the second contact element 6 is connected in an electrically conductive manner to the last electrode 23 of the multi-spark gap 1. All electrodes 2, 21, 22, 23 of the multi-spark gap 1 are thus arranged between the two contact elements 5, 6.

In the two depicted embodiments of the multi-spark gap 1, in addition, a control circuit 7 is provided for controlling the ignition behavior of the multi-spark gap 1, wherein the control circuit 7 has multiple control elements 8 designed as capacitors, which are connected to all electrodes 2, 22, 23 except for the first electrode 21. In addition, the multi-spark gap 1 has an ignition aid 9, which is used to ignite the first individual spark gap 41. The ignition aid 9 has a resistive ignition element 10 as well as the series circuit that has a voltage-limiting element 11 and a voltage switch element 13. As a voltage-limiting element 11, in particular a varistor can be used, and as a voltage switch element 13, in particular a gas discharge valve can be used. The ignition element 10 is connected to the electric-arc combustion chamber 12 of the first individual spark gap 41. In addition, the resistive ignition element 10 is electrically connected on the one side to the first electrode 21 and on the other side via the series circuit that consists of the voltage-limiting element 11 and voltage switch element 13 to the second contact element 6.

The multi-spark gap 1 according to the invention is divided into two areas, namely a first area that comprises the first individual spark gap 41 and a second area that comprises the other individual spark gaps 4. Moreover, the first area also includes the ignition aid 9 with the resistive ignition element 10 extending into the electric-arc combustion chamber 12 of the first individual spark gap 41, and the second area includes the control circuit 7 with the individual control elements 8.

As can be seen from both figures, the distance $x_1$ between the first electrode 21 and the adjacent second electrode 22, which together form the first individual spark gap 41, is significantly larger than the respective distance $x_2$ between the other adjacent electrodes 2, 22, 23, which form the additional individual spark gaps 4. The distance $x_1$ between the first electrode 21 and the adjacent second electrode 22 is preferably between 1 mm and 2 mm, while the distance $x_2$ between the other adjacent electrodes 2, 22, 23 of the additional individual spark gaps 4 is preferably between 0.05 mm and 0.15 mm. The distance $x_1$ is thus preferably about ten times as large as the distance $x_2$.

Because of the relatively large distance $x_1$ between the first electrode 21 and the adjacent second electrode 22, the first individual spark gap 41 and thus also the multi-spark gap 1 as a whole have a sufficiently high insulation strength. At the same time, because of the very small distance $x_2$ between the adjacent electrodes 2, 22, 23 of the additional individual spark gaps 4, the response voltage is considerably reduced in the second area. Because of the ignition aid 9 that is made in addition, the multi-spark gap 1 thus has a very low protective level in the case of simultaneously high power-follow current extinguishing capacity.

Figure 2:
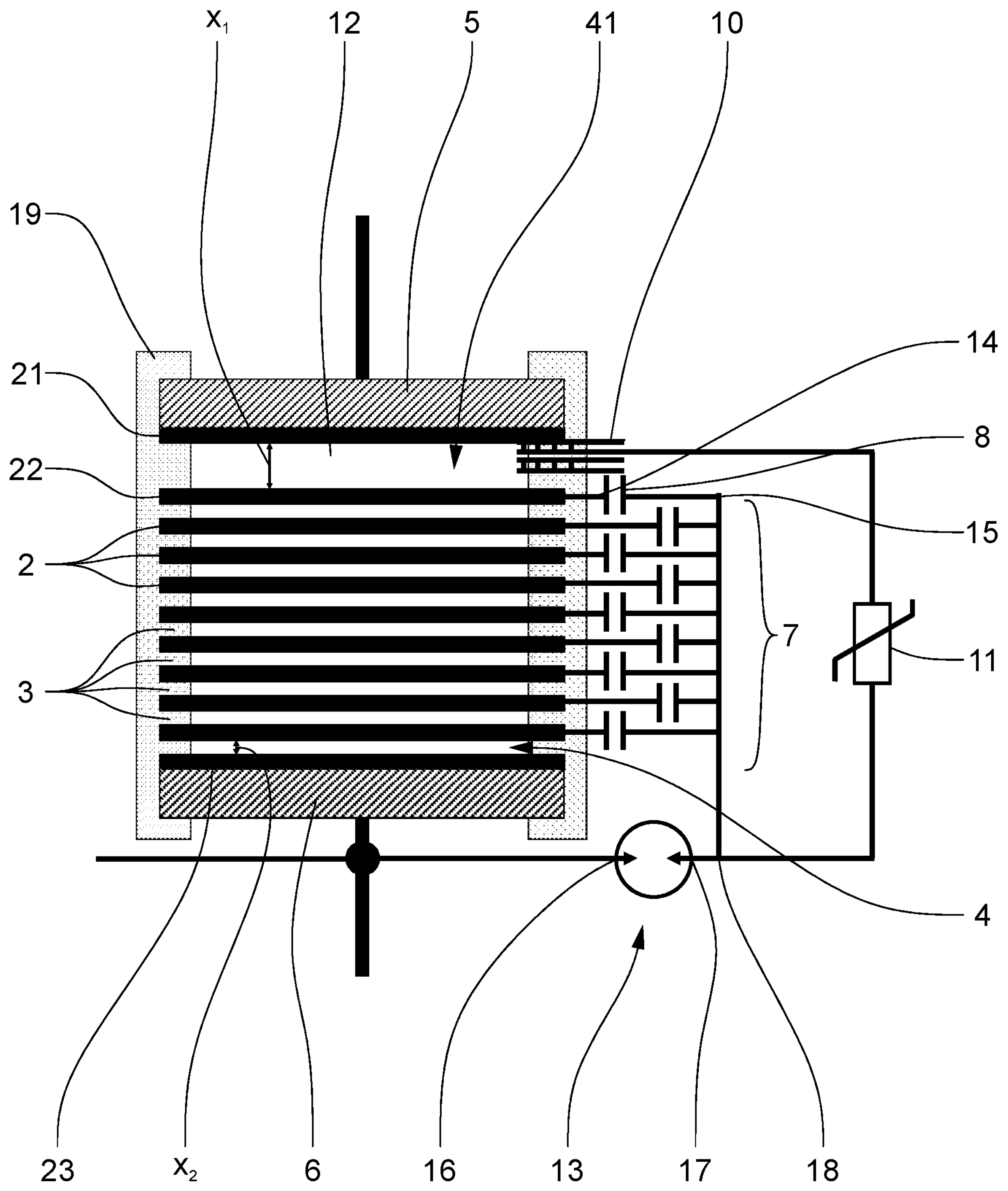
FIG. 2 shows a schematic diagram of a second embodiment of a multi-spark gap, in sectional view.

Both in the embodiment according to FIG. 1 as well as in the embodiment according to FIG. 2, the control circuit 7 has capacitors as control elements 8. In principle, however, other control elements can also be used. The first connector 14 of the individual control elements 8 is in each case connected in an electrically conductive manner to an electrode 2, 22, 23, while the second connectors 15 of the control elements 8 are electrically connected to one another. In the embodiment according to FIG. 1, these second connectors 15 of the control elements 8 are directly connected in an electrically conductive manner to the second contact element 6.

In the embodiment according to FIG. 2, however, the voltage switch element 13 is connected to the ignition aid 9 between the second contact element 6 and the common potential 18 of the second connectors 15 of the control elements 8. This ensured that the control circuit 7 or the individual control elements 8 are only connected in an electrically conductive manner to the second contact element 6 when the voltage switch element 13 has already responded. The control circuit 7 is thus electrically connected to the second contact element 6 only in the case of discharge, ensuring that the insulation property of the multi-spark gap 1 is considerably improved in the second area.

The embodiments of the multi-spark gap 1 depicted in FIGS. 1 and 2 thus differ in how the ignition aid 9 is actually arranged relative to the control circuit 7. In the embodiment according to FIG. 2, the voltage switch element 13 is connected in an electrically conductive manner with its first connector 16 to the second contact element 6 and with its second connector 17 both to the voltage-limiting element 11 and to the common potential 18 of the second connectors 15 of the control elements 8.

In the two embodiments, the individual insulation elements 3 are part of a common insulation and holding arrangement 19, which is simultaneously also used for mechanical attaching of the individual electrodes. In addition, the two contact elements 5, 6 are also accommodated by the insulation and holding arrangement 19, so that a relatively compact multi-spark gap 1 can be produced. Because of the very small distances $x_2$ between the electrodes 2, 22, 23 that form the additional individual spark gaps 4, the multi-spark gap 1 can have multiple electrodes 2, 22, 23, without the dimensions of the multi-spark gap 1 thus being too large between the two contact elements 5, 6. In this case, it is obvious to one skilled in the art that the number of electrodes 2 depicted in FIGS. 1 and 2 is only by way of example, and the multi-spark gap 1 according to the invention is in no way limited to the depicted number of electrodes 2.

REFERENCE SYMBOLS

1 Multi-spark gap
2 Electrodes
21 First electrode
22 Second electrode
23 Last electrode
3 Insulation element
4 Individual spark gap
41 First individual spark gap
5 Contact element
6 Contact element
7 Control circuit
8 Control element
9 Ignition aid
10 Ignition element
11 Voltage-limiting element
12 Electric-arc combustion chamber
13 Voltage switch element
14 First connector of the control element
15 Second connector of the control element
16 First connector of the voltage switch element
17 Second connector of the voltage switch element
18 Common potential of the second connectors of the control elements
19 Insulation and holding arrangement
$x_1$ Distance between electrodes and the first individual spark gap
$x_2$ Distance between electrodes and additional individual spark gaps

What is claimed is:

1. A multi-spark gap for an overvoltage protector, comprising:

multiple electrodes, and insulation elements arranged between the electrodes, wherein the electrodes are arranged in facing pairs each of which forms an individual spark gap, the individual spark gaps being connected in series, two electrically conductive contact elements, between which the electrodes are arranged, so that a first contact element makes electrical contact with a first of the electrodes, and the second contact element makes electrical contact with the last of the electrodes of the multi-spark gap, and a control circuit for controlling the ignition behavior of the multi-spark gap, wherein the control circuit has multiple control elements which are connected to the electrodes, except for the first electrode, wherein a distance $x_1$ between the first electrode and an adjacent second electrode, which together form a first of the individual spark gaps, is larger than respective distances $x_2$ between the other pairs of electrodes which form additional individual spark gaps, wherein an ignition aid for igniting a first individual spark gap is provided, which aid has at least a resistive ignition element and a voltage-limiting element, and wherein the ignition element is connected to an electric-arc combustion chamber of the first individual spark gap and is electrically connected on one side to the first electrode and on another side is connected to the second contact element via the voltage-limiting element.

2. The multi-spark gap according to claim 1, wherein, in each case, a first connector of a control element is connected to an electrode of a respective one of the additional individual spark gaps and is connected with a second connector to one another and to the second contact element.

3. The multi-spark gap according to claim 2, wherein a first connector of the voltage switch element is connected in an electrically conductive manner to the second contact element and a second connector of the voltage switch is connected to both the voltage-limiting element and to the second connectors of the control elements.

4. The multi-spark gap according to claim 1, wherein the ignition aid has a voltage switch element which is arranged in a series circuit with the resistive ignition element and the voltage-limiting element.

5. The multi-spark gap according to claim 1, wherein the distance $x_1$ between the first electrode and the adjacent second electrode of the first individual spark gap is at least 0.5 mm.

6. The multi-spark gap according to claim 1, wherein the distances $x_2$ between the adjacent electrodes of the additional individual spark gaps are in each case at most 0.2 mm.

7. The multi-spark gap according to claim 1, wherein the distance $x_1$ is between 1 mm and 2 mm and the distances $x_2$ between the electrodes of the additional individual spark gaps between 0.05 mm and 0.15 mm.

8. The multi-spark gap according to claim 1, wherein the distances $x_2$ between the adjacent electrodes of the additional individual spark gaps are essentially the same.

9. The multi-spark gap according to claim 1, wherein the distance $x_1$ between the first electrode and the adjacent second electrode of the first individual spark gap is at least five times the distance $x_2$ between the adjacent electrodes of the additional individual spark gaps.

10. The multi-spark gap according to claim 1, wherein the individual electrodes are thin disks of carbon.

11. The multi-spark gap according to claim 1, wherein the insulation elements between the individual electrodes are part of a common insulation and holding arrangement, in which both the individual electrodes as well as the contact elements are arranged.

12. The multi-spark gap according to claim 1, wherein the individual insulation elements between the individual electrodes are in each case part of an individual insulation and holding frame, and wherein the individual insulation and holding frames are connected to one another.

13. The multi-spark gap according to claim 12, wherein the individual insulation and holding frames in each case have a receptacle opening for accommodating a control element.

* * * * *